R. SNEDDEN.
GUM KNEADING MACHINE.
APPLICATION FILED JAN. 26, 1912.

1,055,824.

Patented Mar. 11, 1913.
5 SHEETS—SHEET 2.

ATTEST
E. M. Fisher
L. C. Musson

INVENTOR
RICHARD SNEDDEN
BY Fisher + Moser
ATT'YS.

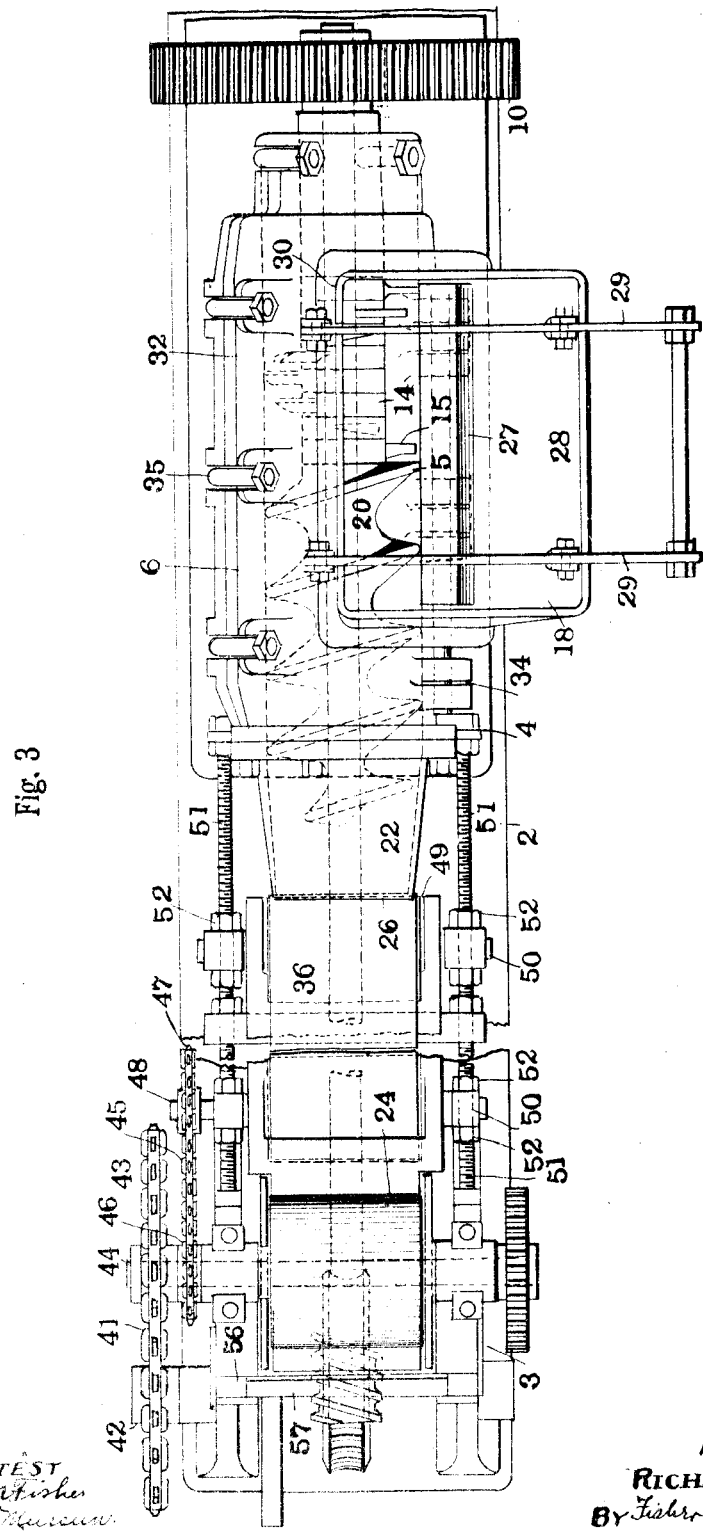

R. SNEDDEN.
GUM KNEADING MACHINE.
APPLICATION FILED JAN. 26, 1912.
1,055,824.
Patented Mar. 11, 1913.
5 SHEETS—SHEET 4.
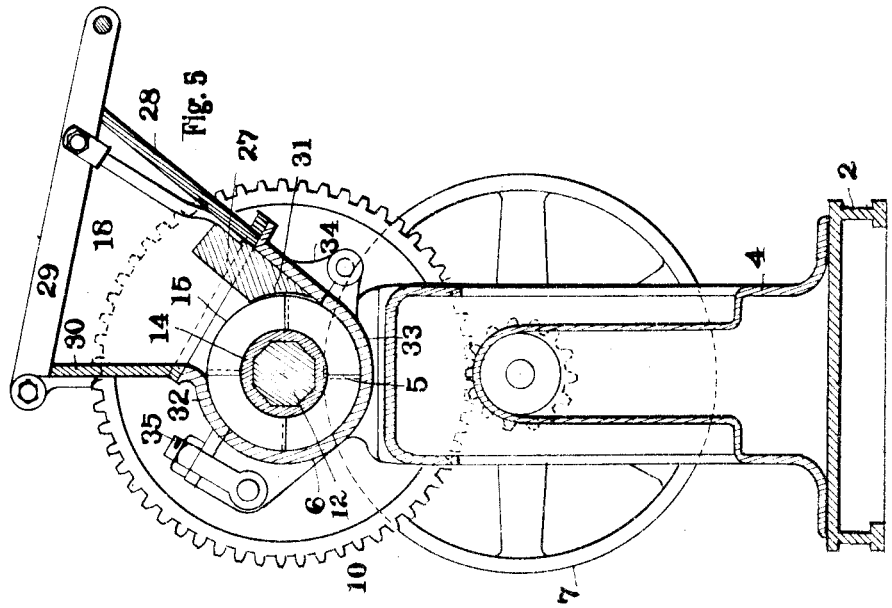
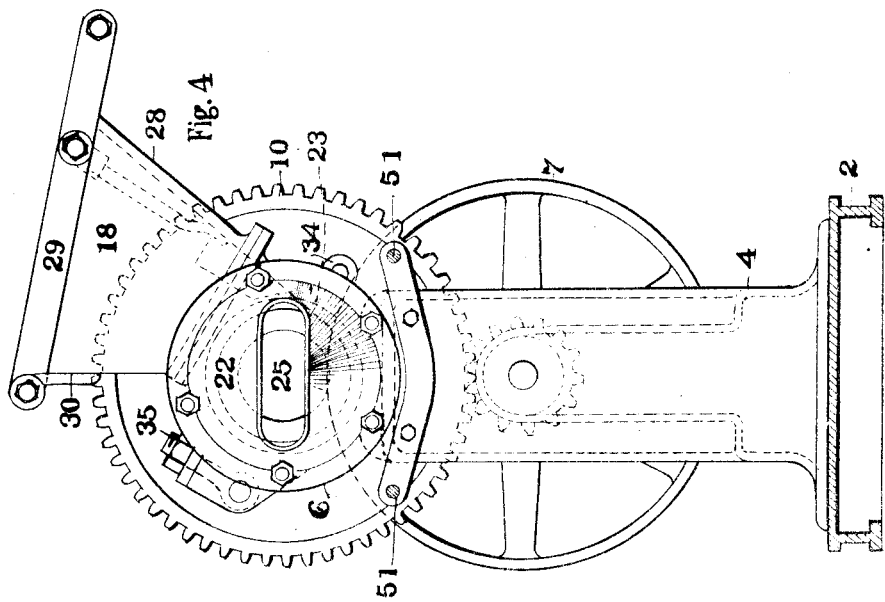
ATTEST
INVENTOR
RICHARD SNEDDEN.
BY Fisher & Moore Attys.

R. SNEDDEN.
GUM KNEADING MACHINE.
APPLICATION FILED JAN. 26, 1912.

1,055,824.

Patented Mar. 11, 1913.
5 SHEETS—SHEET 5.

ATTEST
EM Fisher
FC Musser

INVENTOR
RICHARD SNEDDEN
BY Fisher & Albert ATT'YS

UNITED STATES PATENT OFFICE.

RICHARD SNEDDEN, OF CLEVELAND, OHIO.

GUM-KNEADING MACHINE.

1,055,824.      Specification of Letters Patent.      Patented Mar. 11, 1913.

Application filed January 26, 1912. Serial No. 673,580.

*To all whom it may concern:*

Be it known that I, RICHARD SNEDDEN, a citizen of the United States, residing at Cleveland, in the county of Cuyahoga and State of Ohio, have invented certain new and useful Improvements in Gum-Kneading Machines, of which the following is a specification.

My invention appertains to the manufacture of chewing gum, and the invention comprises a new and useful method and means to knead and prepare materials into chewing gum, all substantially as herein shown and described and more particularly pointed out in the claims.

In view of the elastic gummy nature of the materials entering the manufacture of chewing gum, great difficulty is experienced in kneading and properly preparing the same in certain stages of operations, particularly if the method involves the use of a machine. On this account, kneading has heretofore been mainly done by hand and apart from other operations.

My object is to take the gum material as it comes from the boiling kettles and knead and work it in a continuous manner while under forward feed and under different degrees of compression and pull until it is uniformly reduced to the desired fineness of grain, thickness and density of body, and elastic consistency for chewing gum purposes.

My object is also to provide a practical machine which will knead and prepare the elastic gummy materials as stated, and also shape and cut the material into batches of uniform size and weight so that convenient and economical working and division may thereafter be accomplished to produce the small and thin sticks for the final market.

Figure 1:
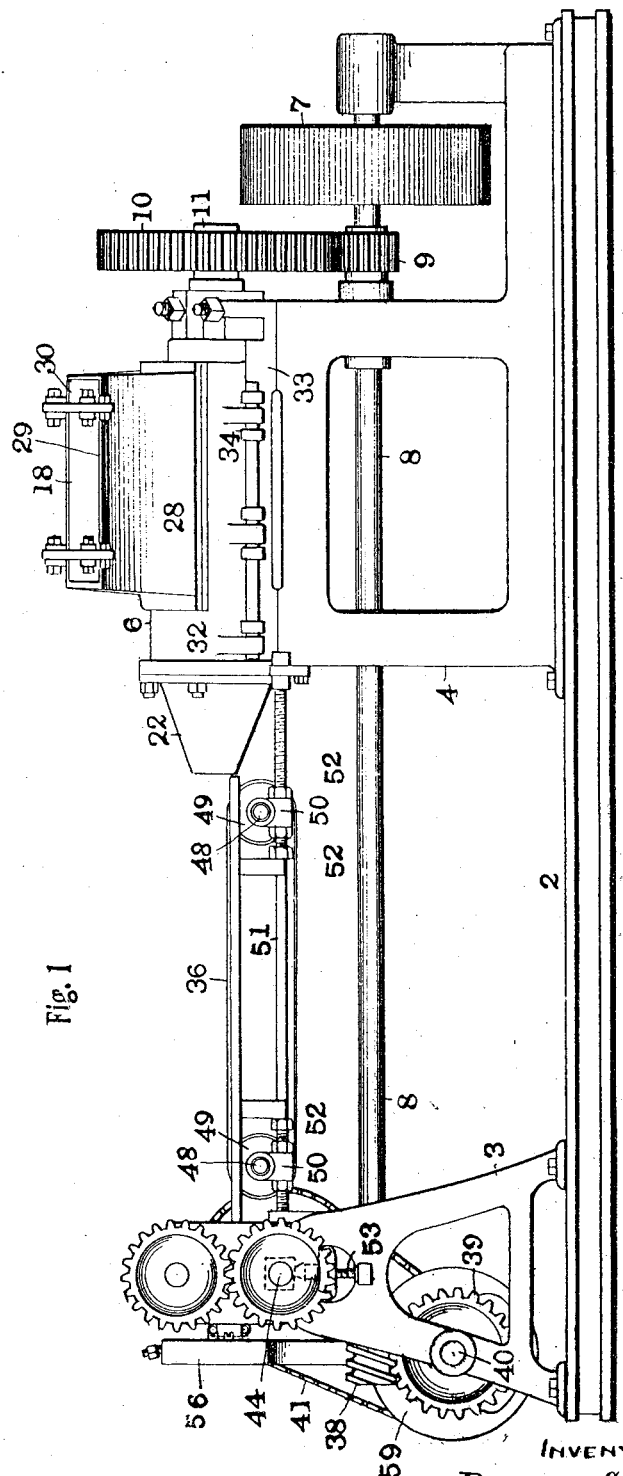
Figure 2:
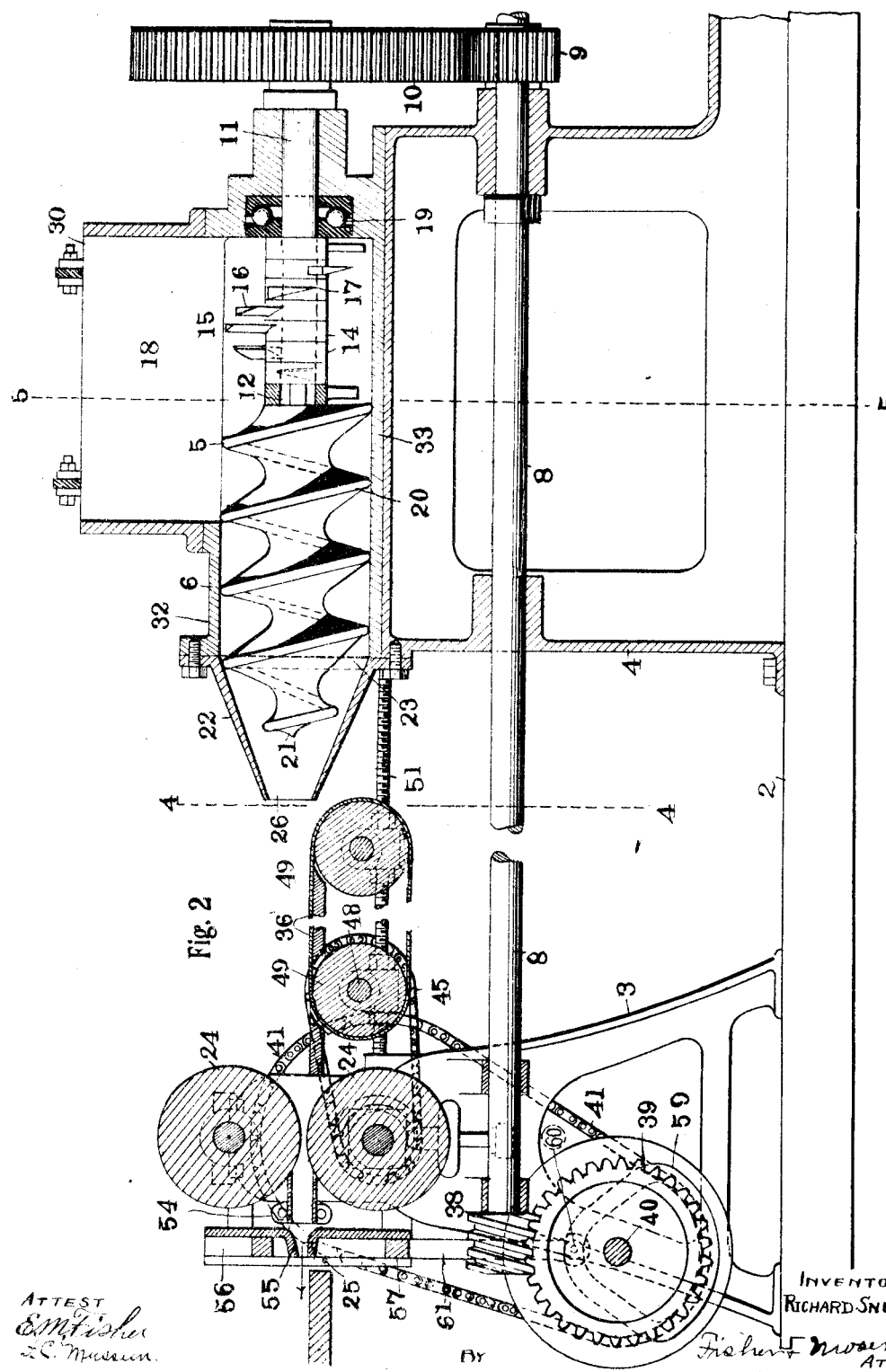
Figure 7:
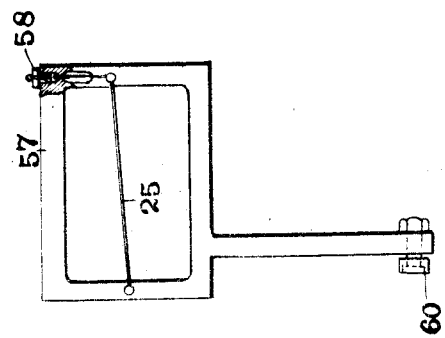
Figure 6:
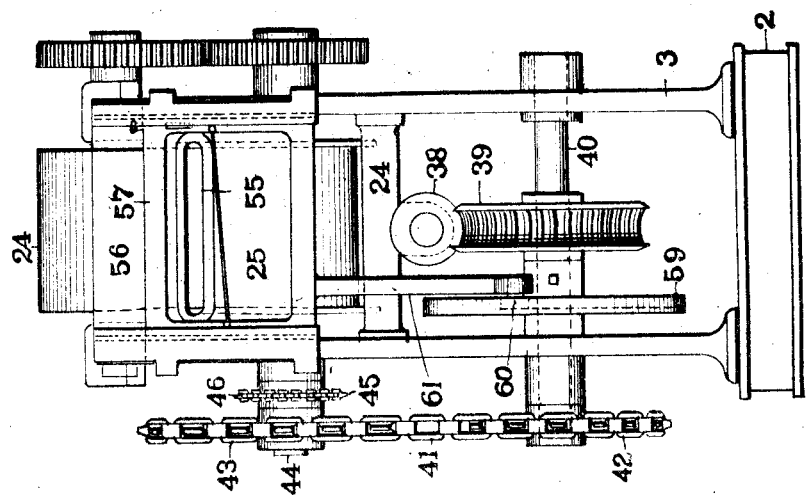

In the accompanying drawings, Figure 1 is a side elevation of my improved machine on a small scale, and Fig. 2 is a longitudinal sectional view thereof enlarged as compared with Fig. 1, a portion being eliminated to permit other essentials to be shown on the single sheet. Fig. 3 is a plan view. Fig. 4 is a cross section of the machine on line 4—4, Fig. 2. Fig. 5 is a cross section on line 5—5, Fig. 2. Fig. 6 is an end elevation of the cutter and roller end of the machine. Fig. 7 is a detail view of the cutter frame.

Now defining details and functions of the invention, the machine consists of a suitable base 2 and upright frames 3 and 4 upon which the working parts are mounted. Thus, beginning with the kneading member 5, I employ a cylindrical casing 6 on frame 4 within which said member is free to be rotated by power applied to pulley 7 on main shaft 8 and through pinion 9 in mesh with gear 10 on the stub shaft 11 of said member 5. The inner portion 12 of shaft 11 is octagonal in cross section to secure a series of collars 14 thereon, each of which have a single radial blade 15 provided with a beveled face 16 and a cutting edge 17, whereby the material entered through hopper 18 may be worked forward and at the same time twisted, mixed and kneaded,—a result further augmented by the radial disposition of the respective blades 15 spirally about shaft 11. Member 5 and its shaft 11 is provided with a ball thrust-bearing 19 to minimize friction and promote easier operation. Member 5 also comprises a screw 20 in advance of blades 15, the spiral thereof being of corresponding lead to that of the blades, and this screw works closely within cylindrical casing 6 and has a reduced end 21 projecting part-way into the tapering outlet cap 22 which is bolted to the front end of casing 6. The intake opening 23 of cap 22 is circular to correspond to the cylindrical bore of casing 6; whereas its outlet end is of an elongated form to flatten the outgoing material so that the same may more readily be further flattened by the rollers 24 before cutting it into predetermined lengths by reciprocating cutter 25. As shown, the mouth or opening 26 of the cap 22 is also slightly reduced in size (in the aggregate) as compared with intake opening 23 to cause the material to be compacted and compressed before being discharged, but not to such an extent that undue resistance and overcrowding of the material will occur to interfere with continuous operations. In fact the construction of cap 22 taken with the screw 20, will positively cause a kneading action of the material by the screw, which is particularly constructed with its thread or worm of uniform outside diameter substantially its full length, and with ample width of groove between the thread, but which groove is gradually deepened toward cap 22, the object being to hold a gradually-increasing amount of material; to effect proper kneading; to prevent overcrowding; and to obviate twisting of the material as it issues from the mouth 26. Briefly, the depth of the helical groove of screw 20 is less where exposed to the incoming material at hopper 18 than at the outlet end of the cylinder 6 where joined with cap 22, and therefore, the material crowded back at the tapering outlet will be amply accommodated in the groove and not prevent the kneading action which the screw is designed to give in addition to its feeding action. The relation of the hopper 18 to the screw 20 also has vital bearing in obtaining effective kneading and feeding operations, particularly with materials having elastic and gummy characteristics, and for that reason, said hopper is tangentially arranged in respect to cylinder 6 to bring the material into the same at one side of the kneading member. Otherwise, an interrupted irregular feed and consequent imperfect kneading will result, particularly if the hopper is centrally disposed in respect to said member. The elastic gummy nature of the material also requires a more or less forced feed of the material through the hopper to the kneading member, which in the present instance, is obtained by a presser or plunger 27 of considerable weight adapted to slide upon the inclined wall 28 of the hopper 18 and pivotally connected to hand lever 29 which is hinged to the top of vertical wall 30. The plunger is thus also tangentially related with member 5,—thereby promoting positive and uninterrupted feed of the material thereto. The end 31 of plunger 27 is curved to conform to the rounded screw and blade-ends to permit the plunger to come down finally into close working relations therewith. Cylinder 6 is longitudinally divided into two parts on a line which bisects the axis of member 5 at an inclination, the upper part 32 having the hopper fastened thereto and being hinged to the lower part 33 by lugs 34 so that the kneading member may be fully exposed when the upper part is swung down. The parts are locked together by swing-bolts 35.

It is important that the flattened kneaded product be carried away at substantially the same rate of travel at which it issued from mouth 26; that it be further flattened before being cut into lengths; and that all the cut portions shall have equal length and the same amount of material therein in order that the further division of the material into standard strips may be accurately and economically obtained. Therefore, the endless conveyer 36, rollers 24, and cutter 25 are especially designed to have a conjoint action with the kneading member 5, power for said parts being dependent upon main shaft 8 which extends the full length of the machine. Thus, in addition to pinion 9 hereinbefore described, said shaft 8 also carries a worm gear 38 at its end meshing with a gear 39 on cam shaft 40 having bearing in frame 3. A sprocket chain 41 stretched between sprocket wheel 42 on shaft 40 and a sprocket wheel 43 on shaft 44 drives the lower roller of the pair of rollers 24 at a predetermined speed, and a second sprocket chain 45 stretched between a small sprocket wheel 46 on shaft 44 and a relatively larger sprocket wheel 47 on transverse pulley shaft 48 drives conveyer 36, the speed of rotation of the rollers being preferably faster than conveyer 36. Said conveyer is supported by a pair of pulleys 49 mounted on transverse shafts which rotate in bearings 50 having slidable sleeved engagement with a pair of threaded rods 51 connecting frames 3 and 4, nuts 52 being employed at either side of the bearings 50 to adjust and set the rollers at fixed distances apart, and thereby also affording means to bodily shift the conveyer along rods 51, and to take up slack in driving chain 45. The gum in passing between the rollers 24 is compressed and flattened a second time to a greater degree than as received, the lower roller of the pair having adjusting screws 53 to raise or lower the bearings thereof within limits in frame 3 and thereby set the two rollers 24 in closer or wider working relation; and the speed of the rollers is preferably timed to the feed of the conveyer as the needs require, to prevent backing up and buckling of the traveling material as it is reduced to a thinner strip or body. Rollers 24 discharge the flattened material directly into a short tube 54 arranged coincident with a cross passage 55 in the vertically-fixed channeled guide 56 for reciprocating cutter frame 57,—a cross wire 25 serving as the cutting member for the material. This wire 25 is preferably inclined transversely on frame 57 to give a shearing cut and may be tightened by any suitable means, such as a thumbscrew 58 as shown and wherein the wire passes centrally through the milled head at the top where a knot is formed or other enlargement provided for the wire adapting rotation of the screw without twisting the wire. Timed operation of cutter frame 57 is obtained by a grooved cam member 59 affixed to cam shaft 40, a roller 60 on the lower end of rigid arm 61 of the said frame riding in the cam groove.

In method and operation, the material consisting of chicle, sugar and other ingredients, is constantly fed into the hopper 18 in batches as received from the boiling kettles, the material being in a spongy condition and having a temperature of about 200° F. Moreover it is more or less porous and of coarse grain to begin with, and the object is to reduce this spongy material while hot into a solid mass of finer grain by cutting, kneading and compacting it in a continuous manner under a force-feed, and then without break or interruption and while still hot and in a compressed state to further compact and reduce it to a thinner and fixed state and finally to cut it into short lengths. It must be understood that the material cools quickly and is best worked while hot, and that although greatly compacted when it issues from mouth 26, the elastic expansive nature of the material will immediately assert itself unless prevented by forward pull, and for which latter purpose I provide the conveyer 36 and rollers 24 running at predetermined speeds. In other words, the speed of the conveyer is regulated to off-set the tendency of the material to swell after kneading by member 5, and is especially designed to be faster than the feed of the screw to exert a constant pull on the material in its forward travel. The length of the conveyer as defined by the distance between the mouth 26 and rollers 24, is also a factor in producing a product of uniform consistency, thickness and weight at the cutter 25, and particularly when considered in its relation to the rollers 24 which are also designed to pull and stretch the material and give a force-feed thereof to the cutter 25 by rotating at an increased speed as compared with the travel of the conveyer.

In view of the foregoing, it will be seen that my invention comprises an operative apparatus and method for working gum materials, which so far as I know and believe, involve such novelty and importance as to mark a distinct step in the progress of the art of making chewing gum, and the claims forming part hereof, are therefore entitled to a broad and liberal construction.

What I claim is:

1. A gum kneading machine comprising a casing having a tangential intake at its side and a hopper with an inclined wall leading to said intake and a plunger in said hopper to force the material into said intake, and hand controlled means to operate said plunger, in combination with a kneading mechanism rotatably mounted within said casing comprising a series of spirally arranged blades and a compacting feed screw next succeeding said blades and partially exposed to said intake.

2. In a gum kneading machine, a casing and a hopper having a discharge at its bottom into the side of said casing, a rotatable kneading member in said casing exposed to said intake and a series of radially and spirally disposed feed blades in advance of said kneading member, in combination with a plunger operative within said hopper on a plane tangential to said kneading member.

In testimony whereof I affix my signature in presence of two witnesses.

RICHARD SNEDDEN.

Witnesses:
E. M. FISHER,
F. C. MUSSUN.